United States Patent
Browall et al.

(10) Patent No.: US 6,787,264 B2
(45) Date of Patent: Sep. 7, 2004

(54) METHOD FOR MANUFACTURING FUEL CELLS, AND ARTICLES MADE THEREWITH

(75) Inventors: Kenneth Walter Browall, Niskayuna, NY (US); Chang Wei, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 80 days.

(21) Appl. No.: 10/063,939

(22) Filed: May 28, 2002

(65) Prior Publication Data

US 2003/0224232 A1 Dec. 4, 2003

(51) Int. Cl.$^7$ .................... H01M 8/12; B05D 5/12
(52) U.S. Cl. .................... 429/44; 429/30; 429/31; 429/33; 427/115; 427/569; 427/576
(58) Field of Search ............... 427/115, 569, 427/576; 429/30, 31, 32, 33, 44, 45

(56) References Cited

U.S. PATENT DOCUMENTS

| | | | | |
|---|---|---|---|---|
| 4,847,172 A | * | 7/1989 | Maskalick et al. | 429/30 |
| 4,894,297 A | * | 1/1990 | Singh et al. | 429/31 |
| 5,426,003 A | * | 6/1995 | Spengler et al. | 429/31 X |
| 5,445,903 A | * | 8/1995 | Cable et al. | 429/33 |
| 5,935,727 A | * | 8/1999 | Chiao | 429/32 |
| 2002/0072881 A1 | * | 6/2002 | Yang et al. | 427/569 X |
| 2003/0097988 A1 | * | 5/2003 | Schaepkens | 427/569 X |

OTHER PUBLICATIONS

Application No. 09/681,820 (RD–27,190), Barry Lee–Mean Yang et al., filed Jun. 11, 2001.
Application No. 09/683,148 (RD–28,484), Marc Schaepkens, filed Nov. 27, 2001.

* cited by examiner

*Primary Examiner*—Stephen J. Kalafut
(74) *Attorney, Agent, or Firm*—Paul J. DiConza; Patrick K. Patnode

(57) ABSTRACT

A method for manufacturing a fuel cell assembly, and a fuel cell assembly produced by the method, are provided, with the method comprising providing at least one fuel cell unit, wherein providing the at least one fuel cell unit comprises providing at least one substrate; and disposing at least one fuel cell component layer on the at least one substrate, the at least one component layer comprising at least one of an interconnect, an anode, a cathode, and an electrolyte; wherein disposing comprises depositing the at least one component layer using an expanding-thermal-plasma coating apparatus.

48 Claims, 3 Drawing Sheets

US 6,787,264 B2

METHOD FOR MANUFACTURING FUEL CELLS, AND ARTICLES MADE THEREWITH

BACKGROUND OF INVENTION

This invention relates to fuel cells, for example solid oxide fuel cells. More particularly, this invention relates to methods for manufacturing fuel cells. This invention also relates to fuel cells manufactured by such methods.

Solid oxide fuel cells (SOFC's) in part comprise a solid electrolyte layer interposed between two electrodes, the electrodes comprising an anode and a cathode. The electrolyte layer is usually dense so as to be impermeable to gas flow and comprises a material that is an electron insulator and an ion conductor, such as, for example, stabilized zirconia. The electrolyte layer is also generally desired to be as thin as possible to minimize resistance to ionic conduction within the electrolyte layer. In contrast to the dense electrolyte, both the anode and the cathode comprise pores to allow flow of gas within each electrode in order to maintain a local environment suitable for the electrochemical reactions taking place therein. The cathode usually comprises a ceramic material that is doped for high electrical conductivity, such as strontium-doped lanthanum manganite (also referred to herein as lanthanum strontium manganite), and is maintained in an oxidizing atmosphere, such as air or other gas comprising oxygen. The anode usually comprises a mixture of a metal with a ceramic, such as nickel with stabilized zirconia, and is maintained in a reducing atmosphere, such as a gas comprising hydrogen. Interconnection plates, also referred to herein as "interconnects," often electrically connect several anode-electrolyte-cathode units (hereinafter referred to as "fuel cell units") with one another to form a fuel cell assembly.

SOFC electrodes and electrolyte layers are typically manufactured using conventional ceramic fabrication methods, such as tape casting, coat-mix processes, and screen printing. Such methods are limited in their abilities to manufacture desirably thin layers, because they often generate undesirable defects, such as voids and inclusions, within the manufactured layers, increasing the fragility of the inherently brittle ceramic materials; furthermore, these methods involve a significant amount of physical manipulation of the fragile layers, which increases the risk of damaging the article during the manufacturing process. Finally, these methods require significant amounts of time to manufacture and assemble the fragile layers in a fuel cell assembly.

An increasing demand for fuel cells having higher power density drives a need for thinner electrodes and electrolytes, and thus there is a need to provide improved methods for manufacturing thin, mechanically robust fuel cell components and assemblies. Furthermore, there is a need for improved methods that reduce the manufacturing and assembly time of fuel cell components. Additionally, there is a still further need for fuel cell components and assemblies that are thin and sufficiently robust to withstand the rigors of manufacturing, assembly, and operating stresses.

SUMMARY OF INVENTION

Embodiments of the present invention are provided to address these and other needs. One embodiment is a method for manufacturing a fuel cell assembly, comprising providing at least one fuel cell unit. Providing the at least one fuel cell unit comprises providing at least one substrate and disposing at least one fuel cell component layer on the at least one substrate, the at least one component layer comprising at least one of an interconnect, an anode, a cathode, and an electrolyte. Disposing the at least one component layer comprises depositing the at least one component layer using an expanding-thermal-plasma coating (ETP) apparatus.

A second embodiment is a fuel cell assembly manufactured by the method of the present invention.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In one embodiment of the present invention, a method for manufacturing a fuel cell assembly comprises depositing at least one fuel cell component layer on at least one substrate using an expanding-thermal-plasma-coating apparatus. The expanding thermal plasma coating method and apparatus are discussed in detail in, for example, "Apparatus and Method for Large Area Chemical Vapor Deposition Using Expanding Thermal Plasma Generators," U.S. patent application Ser. No. 09/681,820, by Barry Lee-Mean Yang et al., and, as a further example, "Apparatus and Method for Depositing Large Area Coatings on Non-Planar Surfaces," U.S. patent application Ser. No. 09/683,148, by Marc Schaepkens.

Figure 1:
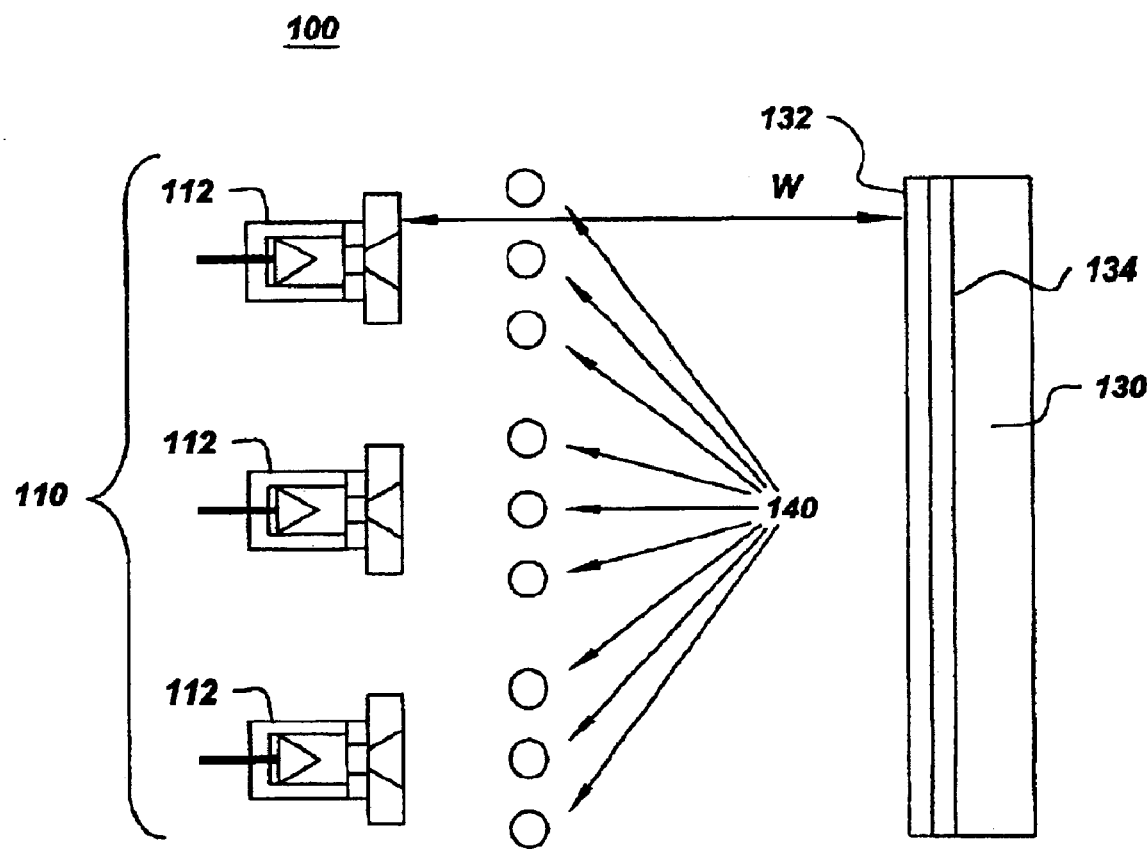
FIG. 1 is a schematic representation of an ETP apparatus.

A non-limiting example of an expanding thermal plasma apparatus 100 is shown in FIG. 1. A coating 132 is deposited on the surface 134 of a substrate 130 as the substrate 130 is scanned in front of an array 110 expanding thermal plasma (hereinafter also referred to as "ETP") sources 112. Alternatively, substrate 130 may be statically mounted in front of array 110. Each of the ETP sources 112 is supplied with at least one reactant gas injector 140 that injects a reactant gas into a plasma generated by a respective ETP source 112. It will be understood by those skilled in the art that the term "reactant gas" as used herein refers to the totality of the gaseous composition issuing from the injector 140, which in certain embodiments is a single gaseous chemical compound and in other embodiments is a mixture of gaseous chemical compounds. Reactant gas comprises compounds known in the art as precursors, which are chemicals that react during processing to form a desired product. Precursors commonly used in chemical vapor deposition processes to deposit materials such as Yttria—stabilized zirconia and other materials used in SOFC's are suitable for use in an ETP apparatus. The reactant gas then reacts with the generated plasma, and at least a portion of the products of this reaction are deposited onto substrate 130 to form coating 132. Using the ETP method to manufacture fuel cell components has a number of advantages over the use of conventional processes such as tape casting. For example, the fuel cell component layer is deposited on, and supported by, a substrate; as such the layer may be significantly thinner than layers manufactured by conventional processes, without risking damage during the manufacturing process. Furthermore, the ETP process is capable of providing higher deposition rates than those commonly available by conventional coating processes such as plasma enhanced chemical vapor deposition (PECVD), with ETP deposition rates often in the range from about 0.1 microns/minute to about 20 microns/minute. The combination of thinner layers with high deposition rates results in the potential to deposit a complete component in substantially less time than could be achieved by conventional ceramic processing methods.

Figure 2:
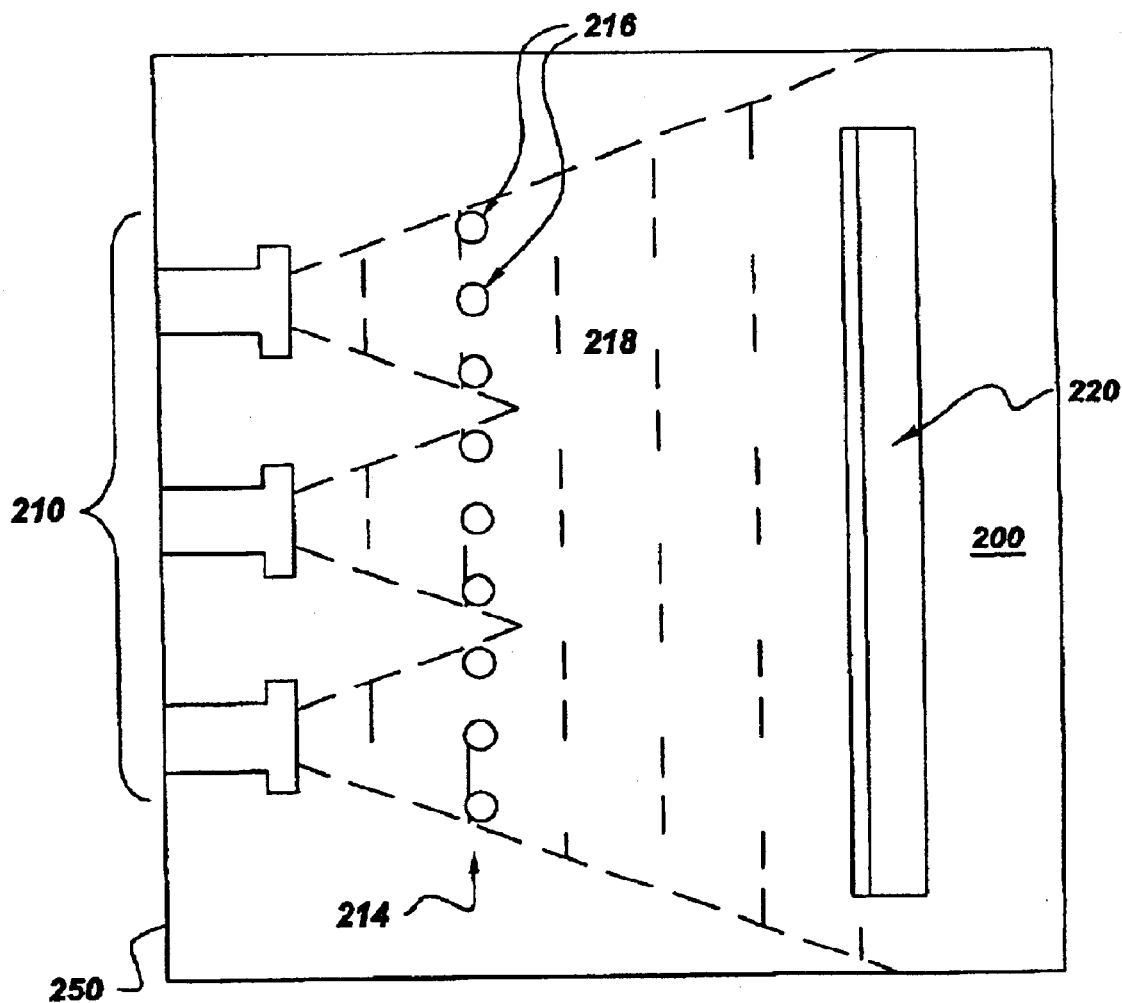
FIG. 2 is a schematic representation of a deposition station.

In FIG. 2, a deposition station 200 is defined to comprise an array of ETP sources 210 and the corresponding array 214 of reactant gas injectors 216, wherein each of the gas injectors 216 inject a reactant gas into a plasma cloud 218 generated by the array of ETP sources 210 corresponding to deposition station 200. In certain embodiments of the present invention, an ETP coating apparatus 250 is used to deposit a plurality of fuel cell component layers. In some embodiments, the ETP coating apparatus 250 comprises a single deposition station 200, and the plurality of component layers is deposited by injecting one reactant gas into the plasma cloud 218 to deposit a first component layer on the substrate 220, followed by stopping the flow of the reactant gas and injecting a different reactant gas into the plasma cloud 218 to deposit a second component layer. This process is repeated until all desired component layers have been deposited on the substrate 220.

Figure 3:
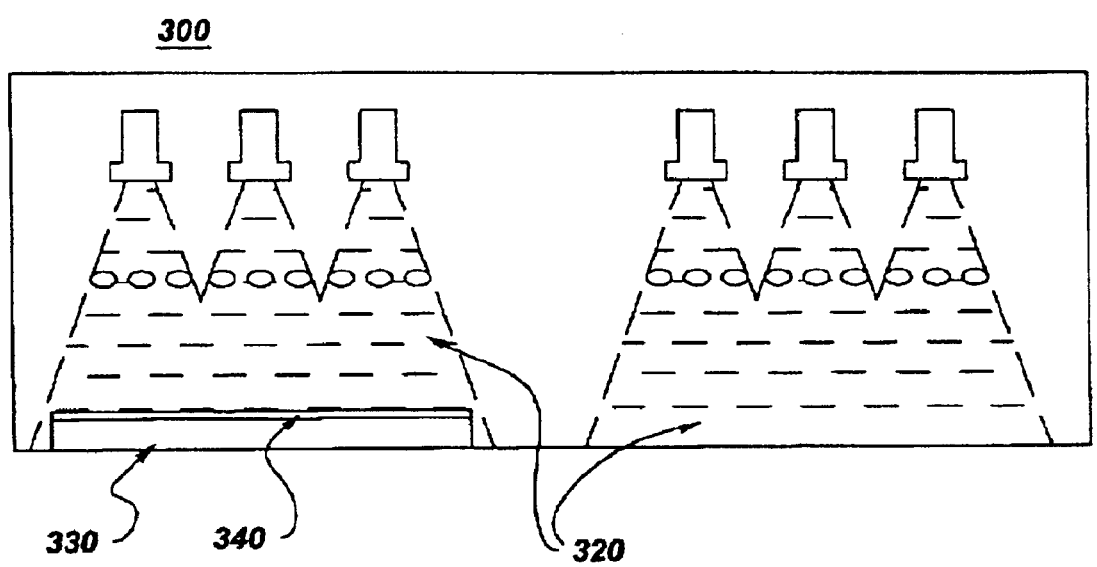
FIG. 3 is a schematic representation of an ETP apparatus comprising a plurality of deposition stations.

In alternative embodiments, as illustrated in FIG. 3, the ETP coating apparatus 300 comprises a plurality of deposition stations 320, and depositing the at least one fuel cell component layer further comprises positioning the at least one substrate 330 onto at least one deposition station 320; depositing at least one component layer 340 onto the at least one substrate 330; and transferring the at least one substrate 330 to at least one different deposition station 320. By this method, for example, a different fuel cell component layer 340 is deposited at each of the plurality of deposition stations 320 in which the at least one substrate 330 is positioned. The use of an apparatus 300 comprising a plurality of deposition stations 320 offers the potential for multiple substrates 330 to be coated simultaneously, increasing the total process throughput.

In the method of the present invention described above, a substrate is provided. certain embodiments, the substrate is planar, while in other embodiments, the substrate is non-planar, for example where the substrate has a cylindrical shape. Methods for accommodating non-planar substrates in the ETP deposition process are described in detail in the aforementioned U.S. patent application Ser. No. 09/683,148. In some embodiments, providing the substrate comprises providing a component of a fuel cell, such as, for example, at least one of an anode, a cathode, and an electrolyte. In such embodiments, the at least one fuel cell component layer deposited using the ETP coating apparatus is deposited directly on a substrate that will serve a function in the resultant fuel cell unit. In other embodiments, providing the at least one substrate comprises providing at least one substrate comprising sacrificial material. Suitable sacrificial materials are those that are capable of being removed after deposition of the component layer, such as by burning, abrasion, or dissolution. Examples of such sacrificial materials include, but are not limited to, polymers, such as polyacrylates and polysiloxanes; salts, such as sodium chloride and potassium chloride, that are soluble in water or other available solvent; and carbon. The use of sacrificial materials as substrates is one of several approaches to the formation of free-standing component layers and assemblies of components, for embodiments in which the method of the present invention further comprises removing the sacrificial material.

As described above, at least one fuel cell component layer is disposed on the at least one substrate, and in certain embodiments a plurality of fuel cell component layers are deposited. The at least one fuel cell component layer comprises at least one of an interconnect, an anode, a cathode, and an electrolyte. The thickness of the at least one component layer is in the range from about 1 micron to about 50 microns, such as, for example, in the range from about 2 microns to about 10 microns. In some embodiments where a plurality of layers is deposited, at least one layer comprising the plurality of layers has a thickness in the range described above. In certain embodiments, each layer comprising the plurality of layers has a thickness in this range. The unique capabilities of the ETP coating process allows for the manufacture of such thin layers, thereby significantly reducing the overall resistance of the fuel cell assembly.

In some embodiments, disposing the at least one component layer comprises disposing an anode. In certain embodiments, disposing the anode comprises disposing a mixture comprising a. at least one of a metal and a metal oxide, and b. an electrolyte material. The mixture comprises from about 20 volume percent to about 80 volume percent of the electrolyte material in some embodiments, and in particular embodiments, the mixture comprises about 50 volume percent of the electrolyte material. Examples of metals suitable for use as the metal in the mixture include, but are not limited to, nickel, copper, silver, and mixtures thereof, while nickel oxide, copper oxide, and silver oxide are non limiting examples of metal oxides suitable for use in embodiments of the present invention. For embodiments where the mixture comprises metal oxide, the method of manufacturing a fuel cell assembly further comprises reducing the metal oxide to its metal constituent, generally by heat treating the assembly in a reducing environment, as is commonly done in the art. In some embodiments, the electrolyte material component of the mixture comprises an ionically conductive ceramic, including, but not limited to, stabilized zirconium oxide, cerium oxide, and mixtures thereof. Those skilled in the art will understand that "stabilized zirconium oxide" refers to zirconium oxide stabilized in the cubic phase by additions of at least one of yttria, calcia, ceria, and other suitable compounds.

In some embodiments of the present invention, disposing the at least one component layer comprises disposing a cathode. For certain embodiments, disposing the cathode comprises disposing a mixture comprising at least one perovskite-structured ceramic material and an electrolyte material. The incorporation of electrolyte material into the cathode materials has been shown to improve electrode performance, particularly at lower temperatures, by increasing the number of available active sites. Examples of suitable perovskite-structured ceramic materials include, but are not limited to, lanthanum strontium manganite, lanthanum calcium manganite, lanthanum strontium ferrite, lanthanum strontium cobalt ferrite, lanthanum strontium manganese ferrite, praseodymium strontium manganite, praseodymium strontium manganese ferrite, and combinations thereof. Suitable alternatives for the electrolyte material, as well as suitable volume percentages of electrolyte material to be added to the mixture, include those described above for the electrolyte material component of the anode.

In some embodiments, disposing the at least one component layer comprises disposing an electrolyte. The electrolyte often comprises an ionically conductive ceramic such as, for example, at least one of stabilized zirconium oxide and cerium oxide. In some embodiments, disposing the electrolyte component layer comprises disposing a plurality of sub-layers, wherein each sub-layer comprises a material selected from the group consisting of stabilized zirconium oxide and cerium oxide. Such an approach may be taken to optimize the microstructure of the electrolyte to provide peak electrochemical performance. For specific embodiments of this type and where the substrate comprises an anode, for example where an anode layer has previously been deposited on the substrate, disposing a plurality of sub-layers comprises disposing a first sub-layer comprising stabilized zirconium oxide adjacent to, and in contact with, the anode. In other embodiments where the substrate comprises a cathode, disposing a plurality of sub-layers comprises disposing a first sub-layer comprising cerium oxide adjacent to, and in contact with, the cathode. Cerium oxide is a more ionically conductive compound than stabilized zirconia, but under certain fuel cell operating conditions, cerium oxide can be reduced to a form that is an electron conductor. To minimize the risk of shorting the cell, while maximizing the ionic conductivity of the electrolyte, cerium oxide is disposed only in the region adjacent to the cathode, where oxygen reacts with electrons generated by the electrochemical reaction of the cell.

In certain embodiments, disposing the at least one component layer comprises disposing an interconnect. In particular embodiments, disposing the interconnect comprises disposing at least one conductive material selected from the group consisting of lanthanum chromite, stainless steel, alloys comprising cobalt and chromium, alloys comprising cobalt and nickel, and alloys comprising nickel and iron. The interconnect is dense so as to be substantially impervious to gas flow, in order to maintain the respective environments local to the anode of one cell unit and the cathode of the adjoining cell unit in a fuel cell assembly.

The ETP coating process advantageously provides the ability to control the structure and composition of the deposited coating by varying certain key processing parameters. For example, the composition of the coating may be controlled by varying the amount and type of precursors injected into the plasma cloud. Similarly, porosity may be controlled, for example, by varying the total gas pressure, the distance between the substrate and the ETP source, the plasma power, and by co-depositing sacrificial material which is subsequently removed from the coating to leave voids. This ability to control the characteristics of the coating in embodiments of the present invention allows for the deposition of fuel cell component layers with specially controlled structure and properties. For example, in some embodiments, disposing the at least one layer comprises disposing at least one layer comprising at least one gradient in at least one parameter selected from the group consisting of composition and porosity. A gradient is produced by varying a particular processing parameter, such as precursor injection rate, as a function of time during coating deposition, such that the material deposited at the beginning of the procedure is deposited using processing parameters significantly different from those used to deposit material later in the procedure.

The flexibility of the ETP coating technique provides the potential to make graded layers having unique features. For example, in some embodiments, the at least one gradient of the at least one layer exists in a direction substantially parallel to the substrate. The term "substantially parallel" as used herein means that an axis of the gradient direction makes an angle with the substrate-layer interface of less than about 45 degrees. This unique structure is produced by varying the appropriate processing parameters while scanning the substrate through the plasma cloud. This procedure is appropriate to use to produce a layer having a gradient parallel to the substrate in, for example, porosity. As fuel gas flows downstream within a fuel cell electrode, the fuel becomes depleted, that is, the fuel is oxidized and is therefore more dilute, as it reacts with the electrode surface. Having an electrode structure, for example, with a gradient in porosity that is substantially parallel to the substrate allows for the porosity to increase in the downstream direction within the electrode, which boosts efficiency by providing easier diffusion of the remaining fuel to active sites for electrochemical reaction. In other embodiments, the at least one gradient of the at least one layer exists in a direction substantially perpendicular to the substrate. The term "substantially perpendicular" as used herein means that an axis of the gradient direction makes an angle with the substrate-layer interface of greater than about 45 degrees. This structure is produced by varying the appropriate processing parameters while holding the substrate stationary within the plasma cloud. This procedure is appropriate to use to produce a layer having a gradient substantially perpendicular to the substrate in, for example, composition or porosity; this ability allows for the creation of structures with, for example, increasing conductivity in the direction of current flow (in the case where the gradient is in composition), or easier gas diffusion, as described above for the case where the gradient is in porosity.

In order to capitalize on several of the advantages described above, a further embodiment of the present invention is a method for manufacturing a fuel cell assembly, comprising: providing at least one fuel cell unit, wherein providing the at least one fuel cell unit comprises providing at least one substrate; and disposing a plurality of fuel cell component layers on the at least one substrate, the plurality of component layers comprising an anode comprising from about 20 volume percent to about 80 volume percent of at least one of stabilized zirconium oxide and cerium oxide and the balance comprising at least one of nickel and nickel oxide, a cathode comprising from about 20 volume percent to about 80 volume percent of at least one of stabilized zirconium oxide and cerium oxide and the balance comprising lanthanum strontium manganite, and an electrolyte comprising at least one of stabilized zirconium oxide and cerium oxide; wherein disposing comprises depositing the at least one component layer using an expanding-thermal-plasma coating apparatus. In some embodiments, each component layer comprising the plurality has a thickness in the range from about 1 micron to about 50 microns, as described in previous embodiments. Other alternative embodiments described above are also applicable to this embodiment. For example, in certain embodiments, the coating apparatus comprises a plurality of deposition stations, and depositing further comprises positioning the at least one substrate onto at least one deposition station; depositing at least one component layer onto the at least one substrate; and transferring the at least one substrate to at least one different deposition station.

Another embodiment of the present invention is a fuel cell assembly by the method of the present invention. The alternatives described above for all of the method embodiments are applicable to the fuel cell assembly embodiments as well. For example, in some embodiments, the at least one layer has a thickness in the range from about 1 micron to about 50 microns. In other embodiments, where a plurality of layers is deposited by the ETP coating apparatus, each layer comprising the plurality of layers has a thickness in the range from about 1 micron to about 50 microns. Furthermore, in some embodiments the at least one layer deposited by the ETP coating apparatus comprises at least one gradient in at least one parameter selected from the group consisting of composition and porosity. As described above, depending on the process used to deposit the coating, the at least one gradient may be substantially parallel to the substrate, and the at least one parameter may be porosity.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A method for manufacturing a fuel cell assembly, comprising:
    providing at least one fuel cell unit, wherein providing said at least one fuel cell unit comprises
        providing at least one substrate; and
        disposing at least one fuel cell component layer on said at least one substrate, said at least one component layer comprising at least one of an interconnect, an anode, a cathode, and an electrolyte;
    wherein disposing comprises depositing said at least one component layer using an expanding-thermal-plasma coating apparatus.

2. The method of claim 1, wherein disposing comprises disposing a plurality of said fuel cell component layers.

3. The method of claim 2, wherein at least one layer comprising said plurality of layers has a thickness in the range from about 1 micron to about 50 microns.

4. The method of claim 3, wherein said thickness is in the range from about 2 microns to about 10 microns.

5. The method of claim 3, wherein each layer comprising said plurality of layers has a thickness in the range from about 1 micron to about 50 microns.

6. The method of claim 5, wherein said thickness of each layer is in the range from about 2 microns to about 10 microns.

7. The method of claim 2, wherein said apparatus comprises a plurality of deposition stations, and wherein depositing further comprises
    positioning said at least one substrate onto at least one deposition station;
    depositing at least one component layer onto said at least one substrate; and
    transferring said at least one substrate to at least one different deposition station.

8. The method of claim 1, wherein disposing said at least one component layer comprises disposing an anode.

9. The method of claim 8, wherein disposing said anode comprises disposing a mixture comprising
    at least one of a metal and a metal oxide; and
    an electrolyte material.

10. The method of claim 9, wherein disposing said mixture comprises disposing a mixture comprising from about 20 volume percent to about 80 volume percent of said electrolyte material.

11. The method of claim 10, wherein said mixture comprises about 50 volume percent of said electrolyte material.

12. The method of claim 9, wherein said metal comprises at least one of nickel, copper, and silver.

13. The method of claim 9, wherein said metal oxide comprises one of nickel oxide, copper oxide, and silver oxide.

14. The method of claim 9, wherein said electrolyte material comprises an ionically conductive ceramic.

15. The method of claim 14, wherein said ceramic comprises at least one of stabilized zirconium oxide and cerium oxide.

16. The method of claim 1, wherein disposing said at least one layer comprises disposing at least one layer comprising at least one gradient in at least one parameter selected from the group consisting of composition and porosity.

17. The method of claim 16, wherein said at least one gradient of said at least one layer exists in a direction substantially parallel to said substrate.

18. The method of claim 16, wherein said at least one gradient of said at least one layer exists in a direction substantially perpendicular to said substrate.

19. The method of claim 1, wherein disposing said at least one component layer comprises disposing a cathode.

20. The method of claim 19, wherein disposing said cathode comprises disposing a mixture comprising
    at least one perovskite-structured ceramic material; and
    an electrolyte material.

21. The method of claim 20, wherein disposing said mixture comprises disposing a mixture comprising from about 20 volume percent to about 80 volume percent of said electrolyte material.

22. The method of claim 20, wherein said mixture comprises about 50 volume percent of said electrolyte material.

23. The method of claim 20, wherein said perovskite-structured ceramic material comprises at least one of lanthanum strontium manganite, lanthanum calcium manganite, lanthanum strontium ferrite, lanthanum strontium cobalt ferrite, lanthanum strontium manganese ferrite, praseodymium strontium manganite, and praseodymium strontium manganese ferrite.

24. The method of claim 20, wherein said electrolyte material comprises an ionically conductive ceramic.

25. The method of claim 24, wherein said ceramic comprises at least one of stabilized zirconium oxide and cerium oxide.

26. The method of claim 1, wherein disposing said at least one component layer comprises disposing an electrolyte.

27. The method of claim 26, wherein said electrolyte comprises an ionically conductive ceramic.

28. The method of claim 27, wherein said ceramic comprises at least one of stabilized zirconium oxide and cerium oxide.

29. The method of claim 28, wherein disposing said electrolyte component layer comprises disposing a plurality of sub-layers, wherein each sub-layer comprises a material selected from said group consisting of stabilized zirconium oxide and cerium oxide.

30. The method of claim 1, wherein providing said at least one substrate comprises providing at least one planar substrate.

31. The method of claim 1, wherein providing said at least one substrate comprises providing at least one non-planar substrate.

32. The method of claim 31, wherein providing said at least one non-planar substrate comprises providing at least one substrate having a cylindrical shape.

33. The method of claim 1, wherein providing said at least one substrate comprises providing at least one substrate comprising at least one of an anode, a cathode, and an electrolyte.

34. The method of claim 1, wherein providing said at least one substrate comprises providing at least one substrate comprising sacrificial material selected from the group consisting of polymers, salts, and carbon.

35. The method of claim 34, further comprising removing said sacrificial material.

36. The method of claim 1, wherein disposing said at least one component layer comprises disposing an interconnect.

37. The method of claim 36, wherein disposing said interconnect comprises disposing at least one conductive material selected from the group consisting of lanthanum chromite, stainless steel, alloys comprising cobalt and chromium, alloys comprising cobalt and nickel, and alloys comprising nickel and iron.

38. A method for manufacturing a fuel cell assembly, comprising:
   providing at least one fuel cell unit, wherein providing said at least one fuel cell unit comprises
      providing at least one substrate; and
      disposing a plurality of fuel cell component layers on said at least one substrate, said plurality of component layers comprising
         an anode comprising from about 20 volume percent to about 80 volume of at least one of stabilized zirconium oxide and cerium oxide and the balance comprising at least one of nickel and nickel oxide,
         a cathode comprising from about 20 volume percent to about 80 volume percent of at least one of stabilized zirconium oxide and cerium oxide and the balance comprising lanthanum strontium manganite, and
         an electrolyte comprising at least one of stabilized zirconium oxide and cerium oxide;
   wherein disposing comprises depositing said at least one component layer using an expanding-thermal-plasma coating apparatus.

39. The method of claim 38, wherein each layer comprising said plurality of layers has a thickness in the range from about 1 micron to about 50 microns.

40. The method of claim 38, wherein said apparatus comprises a plurality of deposition stations, and wherein depositing further comprises
   positioning said at least one substrate onto at least one deposition station;
   depositing at least one component layer onto said at least one substrate; and
   transferring said at least one substrate to at least one different deposition station.

41. A fuel cell assembly manufactured by a method, the method comprising
   providing at least one fuel cell unit, wherein providing said at least one fuel cell unit comprises
      providing at least one substrate; and
      disposing at least one fuel cell component layer on said at least one substrate, said at least one component layer comprising at least one of an interconnect, an anode, a cathode, and an electrolyte;
   wherein disposing comprises depositing said at least one component layer using an expanding-thermal-plasma coating apparatus, wherein said at elast one layer comprises at least one gradient in at least one parameter selected from the group consisting at least one gradient in at least one parameter selected from the group consisting of composition and porosity, and wherein said at least one gradient of said at least one layer exists in a direction substantially parallel to said substrate.

42. The fuel cell assembly of claim 41, wherein said anode comprises from about 20 volume percent to about 80 volume percent of at least one of stabilized zirconium oxide and cerium oxide and the balance comprises at least one of nickel and nickel oxide.

43. The fuel cell assembly of claim 41, wherein said cathode comprises from about 20 volume percent to about 80 volume percent of at least one of stabilized zirconium oxide and cerium oxide and the balance comprises lanthanum strontium manganite.

44. The fuel cell assembly of claim 41, wherein said electrolyte comprises at least one of stabilized zirconium oxide and cerium oxide.

45. The fuel cell assembly of claim 41, wherein said at least one substrate is cylindrical in shape.

46. The fuel cell assembly of claim 41, wherein said at least one parameter is porosity.

47. The fuel cell assembly of claim 41, wherein said at least one layer has a thickness in the range from about 1 micron to about 50 microns.

48. A fuel cell assembly manufactured by a method, the method comprising:
   providing at least one fuel cell unit, wherein providing said at least one fuel cell unit comprises
      providing at least one substrate; and
      disposing a plurality of fuel cell component layers on said at least one substrate, wherein each layer comprising said plurality of layers has a thickness in the range from about 1 micron to about 50 microns, and wherein said plurality of component layers comprises
         an anode comprising from about 20 volume percent to about 80 volume percent of at least one of stabilized zirconium oxide and cerium oxide and the balance comprising at least one of nickel and nickel oxide,
         a cathode comprising from about 20 volume percent to about 80 volume percent of at least one of stabilized zirconium oxide and cerium oxide and the balance comprising lanthanum strontium manganite, and
         an electrolyte comprising at least one of stabilized zirconium oxide and cerium oxide;
   wherein disposing comprises depositing said at least one component layer using an expanding-thermal-plasma coating apparatus, wherein said at least one layer comprises at least one gradient in at least one parameter selected from the group consisting of composition and porosity, and wherein said at least one gradient of said at least one layer exists in a direction substantially parallel to said substrate.

* * * * *